United States Patent [19]

Chang et al.

[11] Patent Number: 4,590,050
[45] Date of Patent: May 20, 1986

[54] SYNTHESIS OF CRYSTALLINE ALUMINUM PHOSPHATES WITH A UREA TEMPLATING AGENT

[75] Inventors: Clarence D. Chang, Princeton; Joseph N. Miale, Lawrenceville, both of N.J.

[73] Assignee: Mobil Oil Corporation, New York, N.Y.

[21] Appl. No.: 684,413

[22] Filed: Dec. 20, 1984

[51] Int. Cl.$^4$ ............................................. C01B 25/36
[52] U.S. Cl. .................................... 423/305; 502/208
[58] Field of Search .................. 423/305, 326–329; 502/150, 162, 208, 214

[56] References Cited

U.S. PATENT DOCUMENTS 4,310,440  1/1982  Wilson et al. ........................ 252/435
4,440,871  4/1984  Lok et al. ............................ 502/214

FOREIGN PATENT DOCUMENTS 0715453  2/1980  U.S.S.R. .............................. 423/306

Primary Examiner—Edward J. Meros
Attorney, Agent, or Firm—Alexander J. McKillop; Michael G. Gilman; Edward F. Kenehan, Jr.

[57] ABSTRACT

There is provided a method for preparing a microporous crystalline aluminum phosphate with a urea templating agent. Also provided are microporous, crystalline aluminum phosphates having characteristic structures.

4 Claims, No Drawings

SYNTHESIS OF CRYSTALLINE ALUMINUM PHOSPHATES WITH A UREA TEMPLATING AGENT

BACKGROUND

This invention relates to the synthesis of crystalline aluminum phosphates with a urea templating agent.

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates may have water and/or organic amine or quaternary ammonium salt entrapped within the aluminum phosphate. The amine or ammonium salt may play a role as crystallization template. Because of the aluminum/phosphorus atomic ratio of these materials is about unity, they display virtually no ion-exchange properties, the framework positive charge on phosphorus being balanced by corresponding negative charge on aluminum:

$$AlPO_4 = (AlO_2^-)(PO_2^+).$$

The pores of these microporous aluminum phosphates may be uniform and have nominal diameters within the range of about 3 to 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

SUMMARY

According to aspects of the present invention, there are provided a method and a reaction mixture for preparing a microporous crystalline aluminum phosphate, said method comprising forming a reaction mixture capable of forming said aluminum phosphate, said reaction mixture comprising sufficient sources of $Al_2O_3$, $P_2O_5$ and a urea templating agent, said method further comprising maintaining said reaction mixture under sufficient crystallization conditions until crystals of said aluminum phosphate are formed.

According to other aspects of this invention, there are provided microporous crystalline aluminum phosphates having X-ray diffraction characteristics corresponding to the data set forth in Table 1.

EMBODIMENTS

In accordance with the present invention, aluminum phosphates may be prepared by hydrothermal crystallization of a reaction mixture prepared by combining a reactive source of phosphate, alumina and water and a urea directing or templating agent. Optionally, the urea directing agent may be substituted urea. Accordingly, the directing agent may be of the formula

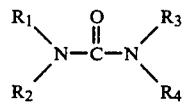

where $R_1$, $R_2$, $R_3$ and $R_4$ are the same or different and are hydrogen or $C_{1-12}$ hydrocarbyl groups. Examples of such hydrocarbyl groups include alkyl groups and aryl groups.

In the as-synthesized form the urea-directing agent is contained within the framework structure of the aluminum phosphate in amounts which vary from species to species but usually do not exceed one mole per mole of $Al_2O_3$ thereof. This urea-directing agent is readily removed by water washing or calcination and does not appear to be an essential constituent of the product aluminum phosphate as evidenced by essentially complete absence of ion-exchangeability of the as-synthesized compositions.

The preparative process may comprise forming a reaction mixture containing in terms of molar ratios of oxides

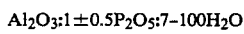

$$Al_2O_3:1 \pm 0.5P_2O_5:7-100H_2O$$

and containing from about 0.2 to 2.0 moles of urea templating agent per mole of $Al_2O_3$. The reaction mixture may be placed in a reaction vessel inert toward the reaction system and heated at a temperature of, e.g., at least about 100° C., preferably between 100° C. and 300° C., until crystallized, usually a period from 2 hours to 2 weeks. The solid crystalline reaction product may then be recovered by any convenient method, such as filtration or centrifugation, washed with water and dried at a temperature between ambient and 110° C. in air.

Synthesis of crystalline aluminum phosphates with various organic templating agents known in the art may leave a carbonaceous residue upon decomposition. With the use of a urea templating agent in accordance with the method of the present invention such a carbonaceous residue may be avoided upon decomposition of the templating agent.

EXAMPLE 1

A mixture of 13 g 85% $H_3PO_4$ (standard laboratory phosphoric acid) and 1 g urea was placed in a 50 ml teflon centrifuge tube. Then 13 g Kaiser alumina powder and 3 g $H_2O$ were added to form a thin slurry. The tube was capped and placed in an autoclave containing sufficient water for autogenous pressure requirements. The autoclave was heated without stirring to 160° C. for 6 days. The tube was filled with off-white solid granules. The X-ray pattern appears to be distinct from any of the known $AlPO_4$ preparations. D-spacing data for the aluminum phosphate of Example 1 is given in Table 1.

TABLE 1

| | | X-Ray Data for Example 1. | | | | | |
|---|---|---|---|---|---|---|---|
| # | D-SPACE | 2THETA | I-BG' | I/IMAX | WIDTH | BG | DELTA |
| 1 | 7.58941 | 11.650 | 229. | 15.1 | 0.21 | 79. | 0.031 |
| 2 | 7.53093 | 11.741 | 261. | 17.2 | 0.18 | 79. | 0.004 |
| 3 | 6.67634 | 13.250 | 1026. | 67.5 | 0.14 | 73. | 0.007 |
| 4 | 6.50351 | 13.604 | 261. | 17.1 | 0.15 | 73. | 0.007 |
| 5 | 5.92270 | 14.946 | 1520. | 100.0 | 0.14 | 73. | 0.002 |
| 6 | 4.89205 | 18.118 | 194. | 12.8 | 0.16 | 59. | 0.001 |
| 7 | 4.64252 | 19.101 | 366. | 24.1 | 0.18 | 65. | 0.002 |
| 8 | 4.50693 | 19.681 | 49. | 3.2 | 0.16 | 77. | 0.009 |

TABLE 1-continued

| # | D-SPACE | 2THETA | I-BG' | I/IMAX | WIDTH | BG | DELTA |
|---|---------|--------|-------|--------|-------|-----|-------|
| | | X-Ray Data for Example 1. | | | | | |
| 9 | 4.28140 | 20.729 | 652. | 42.9 | 0.20 | 74. | 0.002 |
| 10 | 4.25048 | 20.882 | 441. | 29.0 | 0.20 | 74. | 0.001 |
| 11 | 4.16313 | 21.325 | 446. | 29.3 | 0.20 | 74. | 0.003 |
| 12 | 4.07417 | 21.796 | 227. | 14.9 | 0.25 | 74. | 0.004 |
| 13 | 3.91583 | 22.689 | 881. | 57.9 | 0.16 | 74. | 0.005 |
| 14 | 3.72083 | 23.895 | 219. | 14.4 | 0.21 | 94. | 0.001 |
| 15 | 3.68961 | 24.101 | 402. | 26.5 | 0.16 | 94. | 0.003 |
| 16 | 3.50179 | 25.414 | 68. | 4.4 | 0.18 | 66. | 0.009 |
| 17 | 3.37042 | 26.422 | 360. | 23.7 | 0.16 | 73. | 0.000 |
| 18 | 3.32636 | 26.779 | 153. | 10.1 | 0.21 | 73. | 0.000 |
| 19 | 3.29950 | 27.001 | 196. | 12.9 | 0.17 | 73. | 0.004 |
| 20 | 3.16465 | 28.175 | 70. | 4.6 | 0.17 | 104. | 0.003 |
| 21 | 3.06661 | 29.095 | 164. | 10.8 | 0.22 | 84. | 0.003 |
| 22 | 3.01900 | 29.564 | 400. | 26.3 | 0.23 | 83. | 0.000 |
| 23 | 2.98792 | 29.879 | 252. | 16.6 | 0.21 | 83. | 0.005 |
| 24 | 2.95660 | 30.203 | 269. | 17.7 | 0.21 | 83. | 0.001 |
| 25 | 2.94198 | 30.357 | 352. | 23.1 | 0.19 | 83. | 0.003 |
| 26 | 2.89333 | 30.880 | 127. | 8.3 | 0.21 | 83. | 0.004 |
| 27 | 2.85849 | 31.266 | 185. | 12.2 | 0.20 | 83. | 0.005 |
| 28 | 2.83117 | 31.575 | 178. | 11.7 | 0.18 | 83. | 0.006 |
| 29 | 2.78916 | 32.063 | 244. | 16.1 | 0.20 | 91. | 0.002 |
| 30 | 2.75567 | 32.464 | 149. | 9.8 | 0.20 | 101. | 0.002 |
| 31 | 2.62298 | 34.155 | 488. | 32.1 | 0.16 | 64. | 0.000 |

A means for identifying a crystalline aluminum phosphate is by the X-ray diffraction pattern thereof. It will be understood that not all aluminum phosphates of the same structure will generate exactly the same X-ray diffraction data. For example, variations can occur which are attributable to the presence of impurities, e.g., in the form of occluded materials or crystalline intergrowths. Other minor variations can occur, e.g., depending on the degree of thermal treatment of a particular sample.

Aluminum phosphates of the present invention have the X-ray diffraction characteristics corresponding to the data set forth in Table 1. This characterization is intended to take into account the minor variations in interplanar spacings and intensities attributable to factors discussed hereinabove.

EXAMPLE 2

An aliquot of the product of Example 1 was exchanged overnight with 1N $NH_4NO_3$, washed with water, and dried at 130° C. Its cracking activity in terms of Alpha Value was 0.02.

It is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha Value of 1 (Rate Constant=0.016 $sec^{-1}$). The Alpha Test is described in U.S. Pat. No. 3,354,078 and in The Journal of Catalysis, Vol, IV, pp. 522-529 (August 1965), both incorporated herein by reference as to that description.

What is claimed is:

1. A method for preparing a microporous crystalline aluminum phosphate, the framework of said aluminum phosphate having the formula $AlPO_4$, the framework positive charge on phosphorus being balanced by corresponding negative charge on aluminum, said method comprising forming a reaction mixture capable of forming said aluminum phosphate, said reaction mixture comprising sufficient sources of $Al_2O_3$, $P_2O_5$ and a urea templating agent, said urea templating agent being of the formula, $CO(NH_2)_2$, said method further comprising maintaining said reaction mixture under sufficient crystallization conditions until crystals of said aluminum phosphate are formed, said aluminum phosphate having the X-ray diffraction characteristics corresponding to the data set forth in Table 1.

2. A method according to claim 1, wherein said reaction mixture comprises, in terms of molar ratios of oxides, the following:

$$Al_2O_3:1\pm0.5P_2O_5:7-100H_2O$$

and said reaction mixture further comprises from about 0.2 to 2.0 moles of urea templating agent per mole of $Al_2O_3$.

3. A microporous crystalline aluminum phosphate having the X-ray diffraction characteristics corresponding to the data set forth in Table 1, the framework of said aluminum phosphate having the formula $AlPO_4$, the framework positive charge on phosphorus being balanced by corresponding negative charge on aluminum.

4. A microporous crystalline aluminum phosphate prepared in accordance with the method of claim 2, said aluminum phosphate having the X-ray diffraction characteristics corresponding to the data set forth in Table 1.

* * * * *